United States Patent [19]

Lindberg

[11] 4,288,904

[45] Sep. 15, 1981

[54] METHOD AND APPARATUS FOR THE REVERSAL OR REPLACEMENT OF HAMMERS IN HAMMER MILLS

[75] Inventor: Ernst R. Lindberg, Svedala, Sweden

[73] Assignee: Svedala-Arbra AB, Svedala, Sweden

[21] Appl. No.: 17,163

[22] Filed: Mar. 2, 1979

[30] Foreign Application Priority Data

Mar. 3, 1978 [SE] Sweden ................................ 7802439

[51] Int. Cl.[3] ......................... B66C 1/30; B02C 13/00; B23P 19/04

[52] U.S. Cl. ................................ 29/426.3; 294/87 R; 241/194

[58] Field of Search ....................... 29/426, 427, 426.3, 29/426.5; 294/87 R; 241/194

[56] References Cited

U.S. PATENT DOCUMENTS

| | | | |
|---|---|---|---|
| 1,519,045 | 12/1924 | Panko | 294/87 R |
| 2,377,845 | 6/1945 | Westfall | 294/87 R |
| 2,860,000 | 11/1958 | Marcheski | 294/87 R |
| 4,146,185 | 3/1979 | Schober | 241/194 |

*Primary Examiner*—Milton S. Mehr
*Attorney, Agent, or Firm*—Bucknam and Archer

[57] ABSTRACT

A method of mounting and dismounting hammers in a hammer mill in which the hammers are supported in rows on carrier bars, in which each such row of hammers is grasped, lifted and held, by means of a gripping and lifting device, in a position in which the carrier bar, on mounting of the hammers, may, in the unloaded state, be inserted in the row of hammers and connected to the rotor of the hammer mill in order thereafter to be loaded with the weight of the hammers. Moreover, on dismounting of the hammers, the carrier bar may, in the unloaded state, be withdrawn from the row of hammers which is thereafter lifted out of the hammer mill.

8 Claims, 4 Drawing Figures

METHOD AND APPARATUS FOR THE REVERSAL OR REPLACEMENT OF HAMMERS IN HAMMER MILLS

The present invention relates to a method and apparatus for facilitating the reversal or replacement of hammers in hammer mills.

The reversal or replacement of hammers in hammer mills is a considerable problem in the art which becomes proportionately greater with the weight and number of the hammers involved. As a rule, the hammers in hammer mills are supported by the rotor by means of powerful bars which extend through holes in the hammers and through holes in spacers (disks) between which the hammers are placed in rows on the carrier bars. In order to release the hammers, the rotor must be made accessible and the carrier bars must be released and withdrawn, in which operation the hammers must be grasped in one way or another so as not to fall down into the mill housing, whereafter the hammers are lifted out. Remounting of the hammers is effected in the reverse order, that is to say the hammers must be inserted in the contemplated position and the carrier bars inserted in the holes in the spacer elements and in the hammers. These operations may be effected such that each hammer is dealt with separately, but this is a highly time-consuming operation and it has, therefore, been suggested in the art to deal with an entire row of hammers simultaneously for the purposes of hammer replacement. According to one prior art proposal, the hammers should be provided with extra holes which are disposed such that a row of hammers, at a certain rotor position, depend from the carrier bar in such positions that the holes which facilitate dismounting permit the insertion of a lifting rod on which the hammers are suspended after removal of the carrier bar. However, it is very difficult to provide room for the insertion of a sufficiently powerful lifting rod in the extra holes in the hammers for the purposes of lifting an entire row of hammers. Neither is it an easy operation, on reinsertion of a row of hammers, to keep the hammers in the correct mutual positions for their mounting in the spaces between the rotor disks. It is also possible to provide oblong holes in the hammers for the carrier bars, such that a lifting rod may be inserted in the holes while the hammers are still supported on the carrier bars. However, this is also a highly complicated and strenuous method which is possessed of substantially the same disadvantages as the first method described above. To sum up, it might be said that, despite substantial efforts in the art for many years, it has not hitherto been possible to successfully develop a better method than those described above.

The major aspect of the present invention is notwithstanding to realize a method for the reversal or replacement of hammers in a hammer mill in which at least one series of hammers is, after mounting in the hammer mill, pivotally suspended in a row on a bar device which extends through holes in the hammers and is connected to the rotor of the hammer mill. This method, by obviating the above-described disadvantages, facilitates to a great extent the reversal or replacement of hammers in hammer mills.

According to the invention, use is made, for removal of a row of hammers, of a gripping device with a series of gripping members whose spacing is equal to the spacing between the hammers and the hammers in the row are grasped by means of these gripping members by engagement with the hammers at or adjacent their upper ends, such that the hammers are held by means of the gripping members substantially in unchanged mutual positions. Moreover, the gripping device with the row of fixedly retained hammers is lifted, by means of a lifting device, a degree sufficient for relieving the bar device of the weight of the hammers. Finally, the bar device is released from this row of hammers and the row of hammers is lifted out of the hammer mill. For remounting the hammers, these are placed in a row on a substrate outside the hammer mill such that the hammers in the row have the same mutual spacing as their intended spacing in their positions suspended on the rotor. The gripping device is then brought with its gripping members into engagement with the hammers at or adjacent their upper ends such that the holes in the hammers are free for the insertion of the bar device. The hammers are then lifted by means of the lifting device and lowered into the hammer mill to a position in which the bar device may be inserted into the row of aligned holes in the row of hammers and may be connected to the rotor without the bar device being loaded by the weight of the hammers. The gripping device is thereafter lowered such that the hammers are supported on the bar device, whereafter the gripping device is released from the hammers and lifted out of the hammer mill.

A further aspect of the present invention is to provide an apparatus for carrying the above method into effect, the apparatus comprising an elongate gripping and carrier device which supports a row of gripping members. These are spaced apart from each other the same distance as the distance between the hammers in a row of hammers on the rotor of the hammer mill. Moreover, each one of these members includes a pair of opposed gripping shanks located on either side of a plane along the longitudinal axis of the gripping and carrier device. Furthermore, at least one of the gripping shanks is movable with respect to the other for closing and opening of the gripping shanks. Finally the apparatus includes an operating device for the gripping shanks and an apparatus, on each hammer, permitting engagement for the gripping shanks of a gripping member at the edge surfaces of each respective hammer, the apparatus being such that after all of the hammers in a row have been grasped by means of the gripping members, lifting of the row of hammers with unchanged mutual positions is permitted by means of the lifting device.

The nature of the present invention and its aspects will be more readily understood from the following brief description of the accompanying drawings, and discussion relating thereto.

Figure 1:
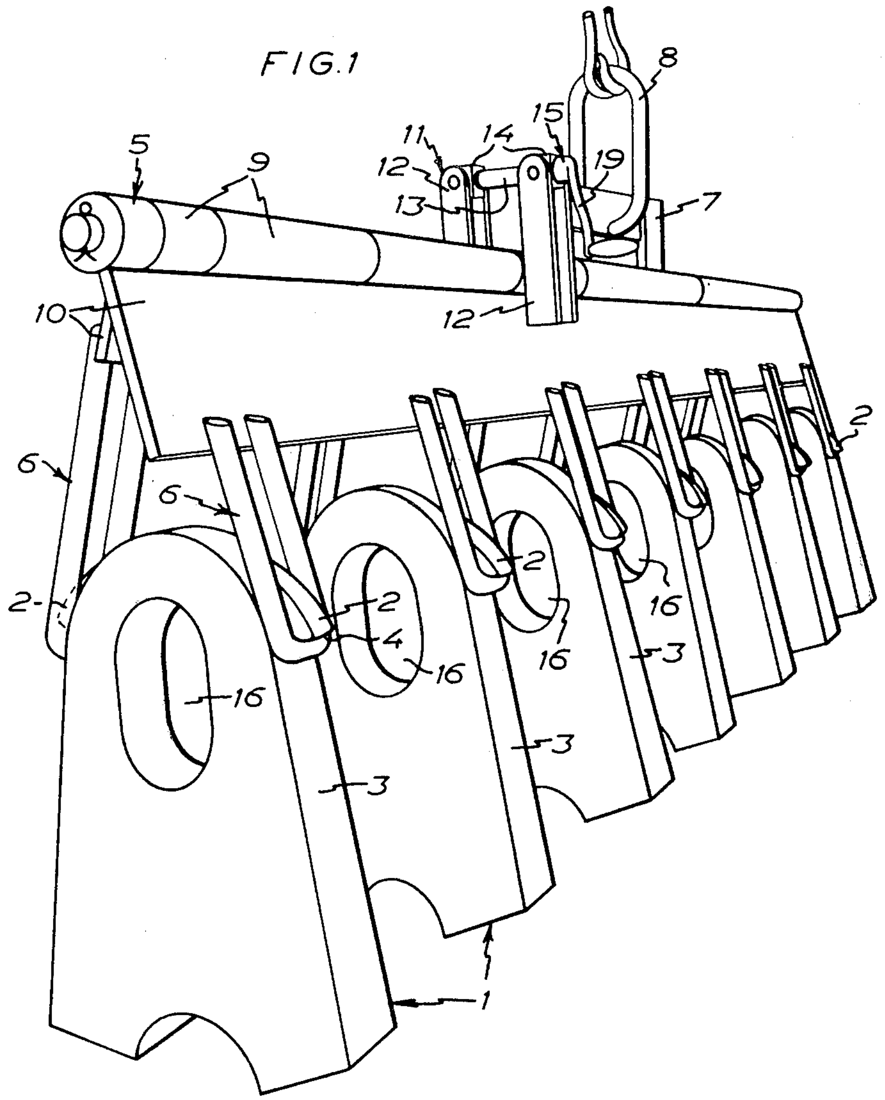
FIG. 1 is a perspective view of a preferred embodiment of an apparatus according to the invention in a lifting phase during the removal or insertion of hammers out of and into a hammer mill, respectively (the hammer mill is not shown)
Figure 2:
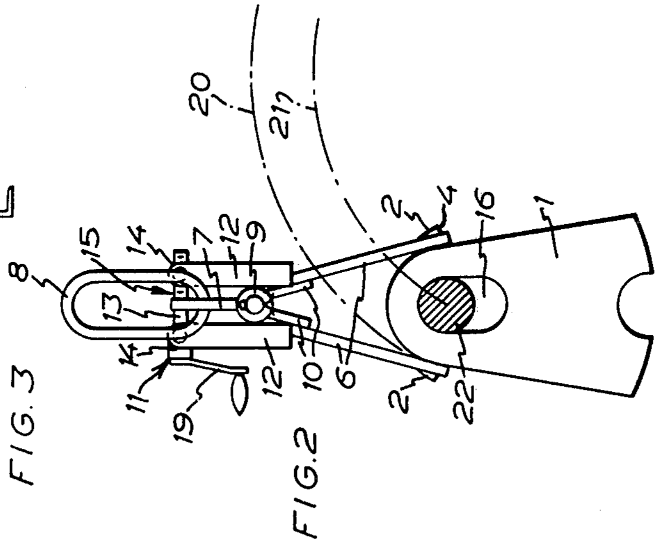
FIG. 2 is a transverse section of the apparatus shown in FIG. 1.

As shown in FIGS. 1 and 2, each hammer 1 is provided with a pair of opposed projections 2 on opposite edge surfaces 3 adjacent the upper end of the hammer. The projections 2 may have substantially horizontal lower abutment surfaces 4, or possibly abutment surfaces with concave recesses, or abutment surfaces which incline outwardly and downwardly at a suitable angle for the purpose which is directly apparent from FIG. 1 and will be described below.

For lifting the hammers, the apparatus comprises a lifting boom 5 with members 6 for gripping the hammers at their projections 2, and with an apparatus which is shown here in the form of a lifting eye 7 for permitting lifting by means of a hoist device of which only a lower chain portion 8 is shown.

Two plates 10 are pivotally mounted by means of hinge devices 9 on the lifting boom. These plates may be of different widths (FIG. 1) or of the same width (FIG. 2) and with which a number of pair-wise opposed gripping members 6 in the form of U-members are connected.

The two plates are pivotal with respect to each other by means of a screw device which is generally designated 11 and consists of a bar device 12 connected to each of the plates. At the upper end of the bar device there is disposed a nut 14 which is pivotal on a shaft 13. A shroud screw 15 is screwed in through the nuts 14 of the bars (one nut being of right-hand and the other of left-hand thread), a crank 19 being fixedly mounted at one end of the shroud screw for turning the screw. When the screw is turned in one direction, the bars may be pivoted in a direction towards each other at their upper ends for pivoting the plates 10 and U-members 6 in a direction away from each other. Moreover, when the screw is turned in the opposite direction, the bars are moved apart at their upper ends and the plates and U-members are pivoted in a direction towards each other.

For lifting a set of hammers 1 simultaneously, the hammers may, for example, be placed on a substrate with the same mutual spacing they are to have in the hammer mill, whereafter the lifting boom 5 is lowered over the row of hammers with the plates 10 and lifting members 6 moved apart Thereafter, the plates with the lifting members are pivoted in a direction towards each other so that the lifting members are moved inwardly towards the hammers and passed in over the projections 2 for engagement under the abutment surfaces 4 of the projections.

Thereafter, the entire row of hammers is lifted by means of a hoist device (for example, a telpher), is moved in over the rotor of the hammer mill (which, in this phase, has no hammers) and is lowered down between the rotor disks to such positions that the carrier bars of the rotor for the hammers may be inserted through holes in the rotor disks and corresponding holes 16 in the hammers. After securement of the carrier bars in a conventional manner, the gripping and lifting apparatus is released from the projections 2 on the hammers and is lifted out of the mill.

Withdrawal of hammers from a hammer mill is effected in the reverse order, that is to say the rotor is first set in such a position that the row of hammers depends in a suitable position from the carrier bars in order to be grasped at the upper ends of the hammers. Thereafter, the gripping and lifting apparatus is lowered for grasping the hammers in the above-described manner, whereafter the row of hammers is lifted a short distance such that the carrier bars are relieved and may easily be withdrawn, whereupon the entire row of hammers is lifted up. If this operation is for the purpose of merely reversing the hammers, the lifting boom is turned and the hammers are re-inserted in place in the above-described manner. However, if the hammers are to be replaced, they are deposited at a suitable place whereafter a new row of hammers is grasped, transferred to and mounted into the mill in the above-described manner.

The circular, broken lines in FIG. 2 intimate the outer contour 20 of a rotor disk and the path of movement 21 of a hole in this rotor disk 20. The illustrated depending position of the hammer 1 in FIG. 2 on a carrier bar 22 inserted through the hole 16 in the hammer (the carrier bar extending through the holes in the rotor disks 20 and being releasably connected to the rotor) may be considered as a suitable position for grasping a row of hammers by means of the apparatus according to the invention.

The projections 2 on each hammer 1 may, naturally, be replaced by other projection shapes or types, for example catches of a suitable type at the upper end of the hammer. Alternatively, the projections may be replaced by depressions in the edge surfaces of the hammer substantially in the region of the projections 2 shown in FIGS. 1 and 2. In this latter case, catches are used instead of U-members 6 on the plates 10. The plates 10 may also be replaced by other suitable operating devices for the U-members or catches. The particular embodiment of these devices shown in FIGS. 1 and 2, and also the embodiment of the lifting boom 5 and the device 11 for closing and opening the U-members and catches should, therefore, be considered simply as examples which are to be preferred because of simplicity of construction and reliability of operation.

Figure 3:
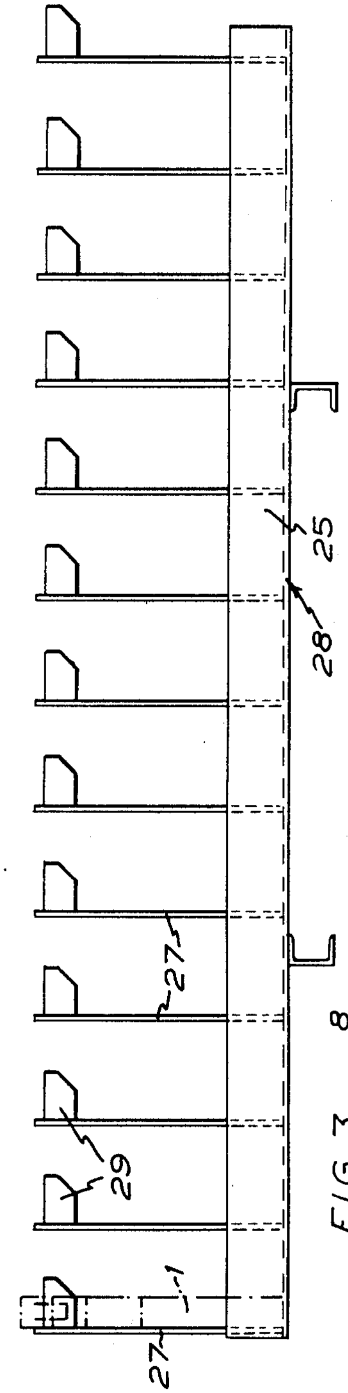
FIG. 3 shows an aid in the form of a magazine in which a row of hammers may be disposed in the correct mutual positions for mounting prior to the lifting operation by means of the apparatus according to FIGS. 1 and 2.
Figure 4:
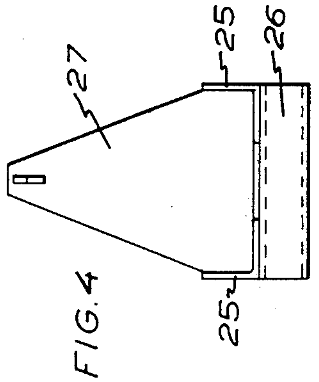
FIG. 4 is an end elevation of the magazine.

FIGS. 3 and 4 show an aid which may be used in combination with the above-described apparatus according to the invention. This aid is in the form of a cassette or magazine for a row of hammers such as, in this case, 13 hammers (only one being shown in FIG. 3).

According to the construction shown in FIGS. 3 and 4, the magazine is constructed from two longitudinal, parallel L-profiles 25 which are turned with their one shank directed upwardly and their other shank directed horizontally towards each other. The two L-profiles are interconnected by means of a pair of suitably spaced transverse U-profiles 26 which are fixedly welded or fixedly retained in any other suitable manner on the under sides of the L-profiles at right angles to the longitudinal direction of the L-profiles. A number of vertical plates 27 are fixedly welded with uniform spacing between the L-profiles, the plates extending at right angles to the longitudinal direction of the L-profiles. In the illustrated embodiment, the plates have a rectangular lower portion and a substantially triangular upper portion. A row of hammers may be inserted between the vertical plates 27 on the longitudinal beam 28 consisting of the mutually interconnected L-profiles 25. This insertion is effected such that each hammer 1 rests with its one side against a vertical plate.

As shown in FIGS. 3 and 4, each vertical plate may at the top be provided with a projection 29 for engagement in those holes 16 in the hammers in which a carrier bar passed through the holes of the rotor disks, is to be inserted for supporting the hammers on the rotor. The sole function of the magazine is to form a means for placing the hammers with that spacing they are to have on suspension on the rotor so that they need not be moved when they are to be grasped and lifted by means of the apparatus according to the invention. The projections 29 on the plates may be dispensed with, but if they are used, the magazine and the hammers must be laterally shifted with respect to each other when the hammers are lifted by means of the lifting device, so that the hammers are released from the magazine.

The apparatus according to the invention shown in FIGS. 1 and 2 comprises as many gripping members as there are hammers for a certain hammer mill, the gripping members being spaced apart from each other the same distance as that between the hammers after being mounted on the rotor. Thus, if a different number of hammers, or different distances between the hammers, is required for a certain hammer mill, the number of gripping members and their mutual spacing on the boom 5 should be adapted according to need.

For balanced lifting of the boom 5 by means of a lifting chain such as in FIGS. 1 and 2, the engagement of the lifting device with the boom must allow for adjustment according to need. For this purpose, the lifting eye 7 may be provided with several depressions or be disposed another suitable way to permit adjustment of the lifting point. Alternatively, a crow foot may be used for securely retaining the lifting boom in a horizontal position during the lifting operation.

The above-described method of making possible the lifting of hammers by engagement with a suitable device, such as projections or recesses at the edge surfaces of the hammers facilitates to a great extent the simultaneous gripping and lifting of a row of hammers from their positions between, for example, perforated rotor disks 20 or corresponding perforated spacer members on the rotor, as well as re-insertion of the hammers between these elements. Experiments which have been carried out demonstrate that the invention provides very great advantages. For example, the replacement of hammers in a conventional hammer mill of the normal size may be effected in approximately from 5 to 6 hours, whereas the corresponding operation in this replacement according to the invention with the above-described apparatus can be carried out in as short a time as roughly 1.5 hours. It should be noted that the reversal of the hammers according to conventional methods is just as time-consuming an operation (approximately 5 to 6 hours), whereas reversal by means of the apparatus according to the invention can be effected in as short a time as about 1 hour. This comparison is valid for normal service and comparable mill sizes.

It is also conceivable to use lifting eyes at the top of the hammers, but the projections (or alternatively the depressions) on the edge surfaces of the hammers provide a much more stable retention and avoid the risk that the hammers will begin to swing during this operation.

For purposes of operating the gripping shanks 6 of the gripping members (which are shown on the drawings in the form of yokes) use may, naturally, be made of an engine-driven apparatus instead of the illustrated manually operable shroud screw device 11 for example, a compressed-air driven or hydraulically driven motor, but the described device 11 has great advantages as a result of its simplicity and because it is not dependent on a power source.

What I claim and desire to secure by Letters Patent is:

1. Method for replacement of hammers in a hammer mill in which at least one series of hammers, after mounting in the hammer mill, is pivotally suspended in a row on a bar which extends through holes in the hammers and is connected to the rotor of the hammer mill, which method comprises the steps for removal of said row of hammers, of manipulating a gripping device having a series of gripping members with spacing equal to the prescribed spacing between the hammers, and grasping the hammers in the row by means of these gripping members by engagement with the hammers at their upper end portions, such that the hammers are held, by means of the gripping members substantially in unchanged mutual positions; lifting said gripping device with the row of fixedly retained hammers a distance sufficient for relieving the bar of the weight of the hammers; releasing said bar from said row of hammers and lifting the hammer row out of the hammer mill; and that, for remounting the hammers, the method comprises the steps of placing the hammers in a row on a base outside the hammer mill such that the hammers in the row have the same mutual spacing as said prescribed spacing; bringing the gripping device with its gripping members into engagement with the hammers at their upper end portions, such that the holes in the hammers are positioned to allow the insertion of the bar, lifting the hammers and lowering them into the hammer mill to a position in which the bar can be inserted into the row of aligned holes in the row of hammers and can be connected to the rotor without the bar being loaded with the weight of the hammers; and lowering the gripping device such that the hammers are supported on the bar, and then releasing the gripping device from the hammers and lifting the gripping device out of the hammer mill.

2. Apparatus for replacement of hammers in a hammer mill, comprising an elongate gripping device which supports a row of gripping members, which gripping members are spaced apart from each other the same distance as the prescribed distance between the hammers in a row of hammers on the rotor of the hammer mill and each one of which gripping members includes a pair of opposed gripping shanks located on either side of a plane along the longitudinal axis of the gripping device, of which shanks at least the one gripping shank is movable with respect to the other for closing and opening of the gripping shanks about the hammers, an operating means for the gripping shanks and means on each hammer being provided to effect grasping engagement by the gripping shanks of a gripping member at the edge surfaces of each respective hammer, said means being such that, after grasping of all of the hammers in a row by means of the gripping members, the row of hammers can be lifted with unchanged mutual positions.

3. Apparatus according to claim 2, wherein engagement means on each hammer consists of two opposed projections provided on the opposing edge surfaces of the hammer, and that said gripping members are disposed for engagement with said projections.

4. Apparatus according to claim 2 wherein the gripping members are supported with the gripping shanks pivotably moveable about a shaft, and that the operating means is effective to operate all gripping members.

5. Apparatus according to claim 4, wherein the operating means is a manually operable screw and nut assembly.

6. Apparatus according to claim 3 wherein the gripping shanks of the gripping members are supported by hinge means on a pivot shaft which is associated with a boom for lifting a row of hammers with which the gripping shanks have been brought into engagement.

7. Apparatus according to claim 2 wherein the shanks of the gripping members, on engagement with the hammers, are disposed simultaneously to be clamped against the opposite edge surfaces of the hammers for fixedly retaining the hammers to counteract swinging movement thereof.

8. Apparatus according to claim 2 wherein the base on which the hammers are placed in said spaced-apart positions is the bottom of a magazine with compartments for placing the hammers in said positions, and that the magazine is open at the top and permits lifting of the hammers from the magazine by means of the gripping device.

* * * * *